US010992867B2

(12) United States Patent
Uesugi et al.

(10) Patent No.: US 10,992,867 B2
(45) Date of Patent: Apr. 27, 2021

(54) IMAGE CAPTURING APPARATUS AND CONTROL METHOD THEREOF AND STORAGE MEDIUM

(71) Applicant: CANON KABUSHIKI KAISHA, Tokyo (JP)

(72) Inventors: Tomomi Uesugi, Kawasaki (JP); Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/790,983

(22) Filed: Feb. 14, 2020

(65) Prior Publication Data

US 2020/0275028 A1 Aug. 27, 2020

(30) Foreign Application Priority Data

Feb. 22, 2019 (JP) .............................. JP2019-030793

(51) Int. Cl.
  *H04N 5/232* (2006.01)
  *G03B 17/14* (2021.01)
  *H04N 5/225* (2006.01)

(52) U.S. Cl.
  CPC ......... *H04N 5/23287* (2013.01); *G03B 17/14* (2013.01); *H04N 5/2254* (2013.01); *H04N 5/23258* (2013.01); *H04N 5/232122* (2018.08); *H04N 5/232123* (2018.08)

(58) Field of Classification Search
  CPC ........... H04N 5/23287; H04N 5/23258; H04N 5/232122; H04N 5/232123; H04N 5/2254; G03B 17/14; G03B 13/36
  See application file for complete search history.

(56) References Cited

U.S. PATENT DOCUMENTS

| 5,946,503 | A | 8/1999 | Washisu |
| 5,974,268 | A | 10/1999 | Washisu |
| 6,091,448 | A | 7/2000 | Washisu et al. |
| 6,154,611 | A | 11/2000 | Washisu |
| 7,432,953 | B2 | 10/2008 | Washisu |
| 8,792,011 | B2 | 7/2014 | Washisu et al. |
| 8,873,942 | B2 * | 10/2014 | Wakamatsu ....... H04N 5/23212 396/55 |
| 8,957,974 | B2 | 2/2015 | Washisu et al. |

(Continued)

FOREIGN PATENT DOCUMENTS

JP  2016-035556 A  3/2016

*Primary Examiner* — Shahbaz Nazrul
(74) *Attorney, Agent, or Firm* — Venable LLP

(57) ABSTRACT

An image capturing apparatus includes an image capturing device, a period detection circuit configured to detect a period of a focus variation, a first detection device configured to detect a first translation component, a second detection device configured to detect a rotation component, a first extraction unit configured to extract a component of a predetermined frequency band from the first translation component, a second extraction unit configured to extract the component of the predetermined frequency band from the rotation component, a obtaining unit configured to compare a signal extracted by the first extraction unit with a signal extracted by the second extraction unit to obtain a rotation radius, and a translation obtaining unit configured to obtain a second translation component using the signal from the second detection device and the rotation radius.

18 Claims, 10 Drawing Sheets

(56) References Cited

U.S. PATENT DOCUMENTS

| | | | |
|---|---|---|---|
| 8,965,191 B2* | 2/2015 | Wakamatsu | H04N 5/23248 396/55 |
| 9,007,468 B2 | 4/2015 | Washisu et al. | |
| 9,294,677 B2 | 3/2016 | Washisu et al. | |
| 9,736,352 B2 | 8/2017 | Honjo et al. | |
| 2008/0136924 A1* | 6/2008 | Washisu | H04N 5/23248 348/208.2 |
| 2010/0013937 A1* | 1/2010 | Washisu | G03B 5/00 348/208.2 |
| 2010/0014847 A1* | 1/2010 | Washisu | G03B 17/00 396/53 |
| 2011/0063458 A1* | 3/2011 | Washisu | H04N 5/23258 348/208.2 |
| 2012/0092511 A1* | 4/2012 | Wakamatsu | G02B 27/646 348/208.2 |
| 2013/0162847 A1* | 6/2013 | Miyazawa | H04N 5/23248 348/208.1 |
| 2013/0163084 A1* | 6/2013 | Miyazawa | G03B 5/00 359/554 |
| 2015/0042828 A1* | 2/2015 | Wakamatsu | H04N 5/23254 348/208.4 |
| 2016/0037053 A1 | 2/2016 | Honjo et al. | |
| 2018/0173079 A1* | 6/2018 | Wakamatsu | G02B 27/646 |

* cited by examiner

IMAGE CAPTURING APPARATUS AND CONTROL METHOD THEREOF AND STORAGE MEDIUM

BACKGROUND OF THE INVENTION

Field of the Invention

The present invention relates to a technology for correcting shake in an optical axis direction in an image capturing apparatus, such as a digital camera or a digital video camera.

Description of the Related Art

Conventionally, there is an image capturing apparatus, such as a digital camera and a digital video camera, equipped with a macro photography mode for magnification shooting of, for example, flowers and insects. With a lens interchangeable digital camera, macro photography is possible by exchanging an interchangeable lens for a macro lens.

In such an image capturing apparatus that allows macro photography, a distance from the image capturing apparatus to a subject during photographing is very short, so a depth of a field becomes extremely shallow. Therefore, due to, for example, a slight body movement and camera shake of a photographer, the image capturing apparatus becomes close to or far from the subject. This makes a focus unstable, and accurately focusing the subject at a moment of photographing becomes extremely difficult.

In order to solve the problem, for example, Japanese Patent Laid-Open No. 2016-35556 discloses an image capturing apparatus that ensures detecting a movement of the image capturing apparatus in a direction along an optical axis with an accelerometer, driving a focus lens based on an output from the accelerometer, and focusing a subject at a high speed.

However, in the conventional technology disclosed in Japanese Patent Laid-Open No. 2016-35556, shake in an optical axis direction is detected using the accelerometer. Therefore, there is a problem that due to an influence from noise superimposed on the accelerometer, the shake in the optical axis direction cannot be stably detected.

SUMMARY OF THE INVENTION

The present invention has been made in light of the foregoing problems and provides an image capturing apparatus that ensures highly accurately correcting shake in an optical axis direction of the image capturing apparatus.

According to a first aspect of the present invention, there is provided an image capturing apparatus, comprising: an image capturing device configured to capture a subject image; a period detection circuit configured to detect a period of a focus variation of the subject image formed on an image capturing surface of the image capturing device with a lens; a first detection device configured to detect a first translation component, the first translation component being a component in a direction along an optical axis of shake of the image capturing apparatus; a second detection device configured to detect a rotation component of the shake of the image capturing apparatus; and at least one processor or circuit configured to function as: a first extraction unit configured to extract a component of a predetermined frequency band from the first translation component based on the period of the focus variation; a second extraction unit configured to extract the component of the predetermined frequency band from the rotation component based on the period of the focus variation; a obtaining unit configured to compare a signal extracted by the first extraction unit with a signal extracted by the second extraction unit to obtain a rotation radius of the shake of the image capturing apparatus; and a translation obtaining unit configured to obtain a second translation component using the signal from the second detection device and the rotation radius, the second translation component being a component in the direction along the optical axis of the shake of the image capturing apparatus.

According to a second aspect of the present invention, there provided a method of controlling an image capturing apparatus including an image capturing device, the image capturing device capturing a subject image, the method comprising: detecting a period of a focus variation of the subject image formed on an image capturing surface of the image capturing device with a lens; detecting a first translation component, the first translation component being a component in a direction along an optical axis of shake of the image capturing apparatus; detecting a rotation component of the shake of the image capturing apparatus; performing a first extraction that extracts a component of a predetermined frequency band from the first translation component based on the period of the focus variation; performing a second extraction that extracts the component of the predetermined frequency band from the rotation component based on the period of the focus variation; comparing a signal extracted in the first extraction with a signal extracted in the second extraction to obtain a rotation radius of the shake of the image capturing apparatus; and calculating a second translation component using the signal from the second detection and the rotation radius, the second translation component being a component in the direction along the optical axis of the shake of the image capturing apparatus.

Further features of the present invention will become apparent from the following description of exemplary embodiments with reference to the attached drawings.

DESCRIPTION OF THE EMBODIMENTS

Figure 1:
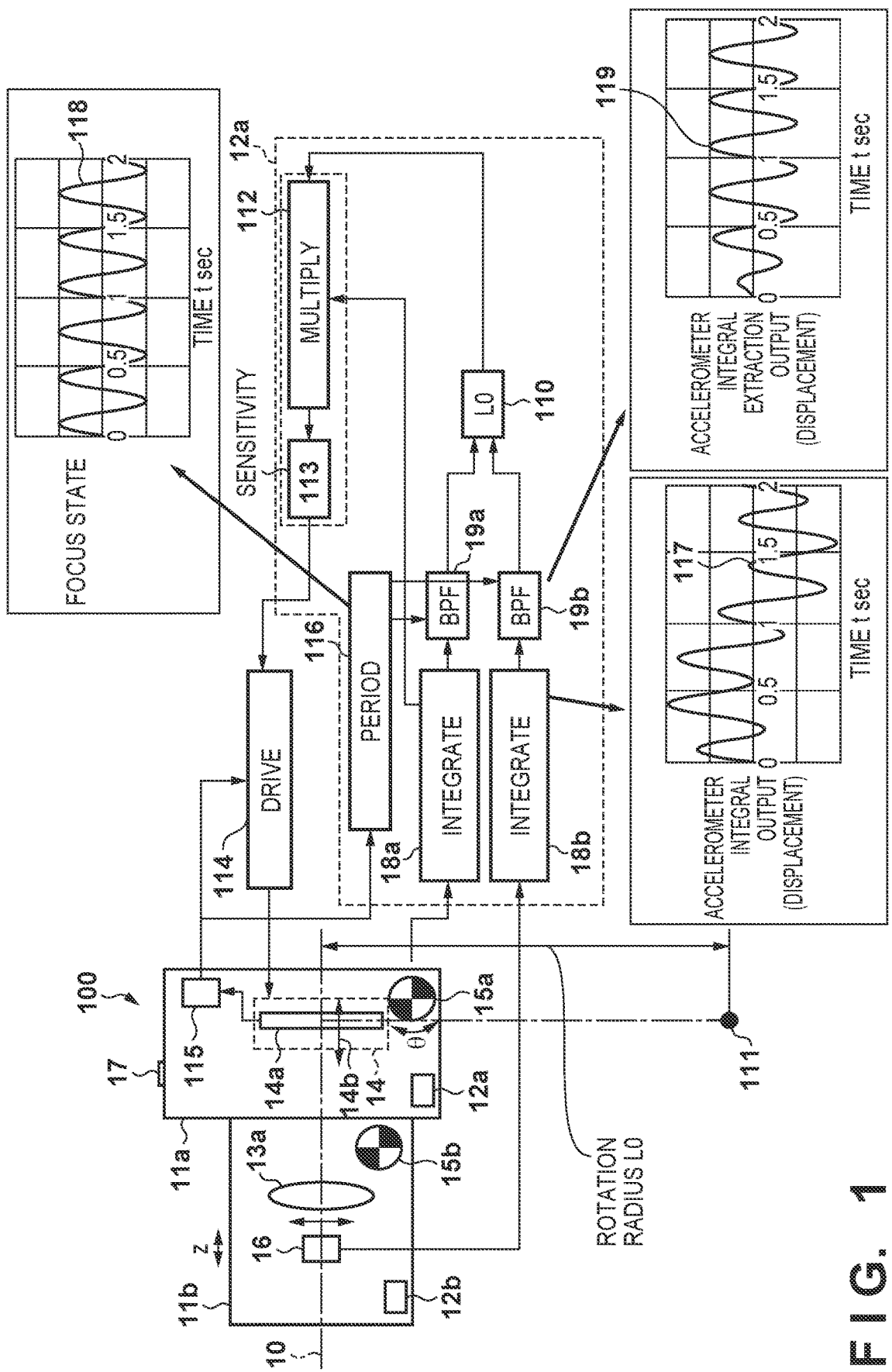
FIG. 1 is a diagram illustrating a configuration of a lens interchangeable digital camera, which is as an image capturing apparatus according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a diagram illustrating a configuration of a lens interchangeable digital camera, which is as an image capturing apparatus according to the first embodiment of the present invention. In FIG. 1, a digital camera 100 includes a camera body (main body of the image capturing apparatus) 11a, and an interchangeable lens 11b detachable from the camera body 11a. The interchangeable lens 11b forms a subject image on an image capturing surface of an image-capturing element 14, which will be described later.

A camera CPU 12a disposed in the camera body 11a wholly controls each functional part in the camera body 11a in response to, for example, a shooting instruction operation by a photographer. The camera CPU 12a also controls an operation of correcting a focus variation caused by shake in an optical axis direction of the digital camera 100, which is a characteristic operation in the present embodiment.

Note that an integration unit, a band pass filter, a comparative unit, a rotation radius calculating unit, a multiplying unit, a sensitivity adjustment unit, and a period output unit are circuits built into the camera body 11a or functions achieved by a computing operation by the camera CPU 12a but are illustrated outside the camera body 11a in FIG. 1 for clarity of the drawing.

A lens CPU 12b disposed in the interchangeable lens 11b controls an overall operation, such as a focus control operation and a zooming operation of the interchangeable lens 11b, in response to, for example, a shooting instruction from the camera body 11a. The lens CPU 12b also controls the operation of correcting the focus variation caused by the shake in the optical axis direction of the digital camera 100, which is a characteristic operation in the present embodiment.

A part of lenses in the interchangeable lens 11b constitutes an image-stabilizing lens 13a that moves in a direction orthogonal to a photographing optical axis 10 to correct image shake caused by, for example, camera shake of the photographer. The image-stabilizing lens 13a is driven based on a signal of an angular velocity meter 15b to correct the image shake in a direction perpendicular to the optical axis.

In FIG. 1, an object light beam along the photographing optical axis 10 is incident on the image-capturing element 14 through a photographing optical system. The image-capturing element 14 outputs a signal in response to the incident object light beam. Generally, an analog image signal output from the image-capturing element 14 is converted into a digital signal, an image process is performed, and processed image data is recorded in, for example, a recording medium.

The image-capturing element 14 includes a focus control mechanism 14a that drives an image capturing surface in which pixels are disposed in a direction indicated by an arrow 14b, a direction along the photographing optical axis 10, and controls the focus. An actuator, such as a piezoelectric element is used for the focus control mechanism 14a. The focus control mechanism 14a is driven to correct the focus variation caused by the shake in the optical axis direction of the camera body 11a.

The camera body 11a includes an angular velocity meter 15a, and a first order integral is performed on a signal of the angular velocity meter 15a by an integrator 18a to convert the signal into an angle signal (rotation component, rotation angle). In addition, the interchangeable lens 11b includes an accelerometer 16, and a second order integral is performed on a signal of the accelerometer 16 by an integrator 18b (translation calculating unit) to convert the signal into a displacement signal (translation component, amount of movement in a translation direction). The accelerometer 16 is disposed in a depth direction of the paper and detects acceleration in a direction along the photographing optical axis 10.

A displacement signal Z indicating an amount of displacement in a photographing optical axis direction output by the integrator 18b is input to a band pass filter 19b, and only a predetermined frequency component is extracted. Although details will be described later, the frequency extracted by the band pass filter 19b here is set so as to match a frequency of the focus variation caused by the camera shake in the optical axis direction (hereinafter, shake in optical axis direction) detected by a focus state detection unit 115 (focus detection unit). In this way, a component (frequency band) matching the frequency of the focus variation is extracted from the displacement signal Z in the optical axis direction. By extracting the component matching the frequency of the focus variation, the component of the frequency band most dominant among the displacements in the optical axis direction can be extracted. A band pass filter 19a extracts the signal of the frequency component same as that of the band pass filter 19b among angle signals θ output from the integrator 18a. A comparative unit 110 obtains a ratio between the angle signal θ of the band pass filter 19a and the displacement signal Z in the optical axis direction of the band pass filter 19b from them. As described above, the band pass filter 19b is disposed to remove low-frequency gravity components and drift components (so-called noise) superimposed on the output of the accelerometer 16, in addition to a purpose of extracting the component matching the frequency of the focus variation. The band pass filter 19a is disposed to match frequency characteristics of the signal of the angular velocity meter 15a with frequency characteristics of the accelerometer 16 whose characteristics have been changed by the band pass filter 19b.

A first ratio obtained by the comparative unit 110 is equivalent to a distance L0 from a rotation center 111 of the shake of the digital camera 100 to the accelerometer 16. This is based on a relationship where a product of the distance L0 and the angle signal θ becomes the displacement signal Z in the optical axis direction.

A multiplying unit 112 multiplies the angle signal θ of the shake from the integrator 18a by a rotation radius L0 obtained from the comparative unit 110 to obtain shake in the direction along the optical axis.

Here, in a case where the shake in the optical axis direction of the digital camera 100 is obtained without a care for accuracy, as described in the description of the related art, it is only necessary to simply perform a second order integral on the output signal of the accelerometer 16. However, actually, due to the noise of the accelerometer 16, the use of the method fails to obtain an accurate displacement in the optical axis direction. Thus, in the present embodiment, the band pass filter 19b is applied to the integrated signal of the signal of the accelerometer 16 to reduce the noise. When the band pass filter is applied, phase lead and phase lag occur in the integrated signal of the accelerometer 16, so this signal cannot be used as the displacement signal of the digital camera 100 as is. Therefore, in the present embodiment, the band pass filter 19a is applied to the integrated signal of the angular velocity meter 15a with the same characteristics, and a ratio with the integrated signal of the accelerometer 16 is calculated to obtain the rotation radius L0. When the rotation radius L0 is obtained from the ratio between the signals to which the band pass filters have been applied, the accurate rotation radius L0 not affected by noise can be obtained. Then, the rotation radius L0 is multiplied by the integrated signal of the angular velocity meter 15a to which the band pass filter 19a is not applied, that is, the angle signal θ where phase lead and phase lag do not occur to obtain the amount of displacement due to the shake of the digital camera 100. Such a method allows highly accurately obtaining the shake along the optical axis direction.

A sensitivity adjustment unit 113 multiplies the shake in the optical axis direction by a sensitivity coefficient of the photographing optical system to convert the shake in the optical axis direction of the digital camera 100 into an amount of focus error in the image capturing surface of the image-capturing element 14. Based on the calculated amount of focus error, an amount of correction to move the image capturing surface of the image-capturing element 14 in the optical axis direction by the focus control mechanism 14a is calculated. Specifically, the amount of focus error in the image capturing surface of the image-capturing element 14 relative to the amount of displacement in the optical axis direction of the digital camera 100 obtained by the multiplying unit 112 changes depending on a focal distance of the photographing optical system, a distance to the subject, and optical sensitivity of the photographing optical system. In general, the closer the subject distance is, the greater the amount of focus error in the image capturing surface of the image-capturing element 14 becomes. Accordingly, the sensitivity adjustment unit 113 obtains an amount of focus correction in the optical axis direction in the image capturing surface of the image-capturing element 14 relative to the amount of displacement of the digital camera 100 according to the focal distance of the optical system, the distance to the subject, and the optical sensitivity of the photographing optical system under the current photographing condition.

Note that, in addition to the amount of focus correction from the sensitivity adjustment unit 113, a signal of the focus state detection unit 115 is also input to a drive unit 114 that actually performs driving to displace the image capturing surface of the image-capturing element 14. In the present embodiment, in accordance with the shooting instruction operation by the photographer, first, the focus control mechanism 14a is driven using the signal of the focus state detection unit 115 for focus adjustment. A focus variation caused by the subsequent shake in the optical axis direction of the camera is corrected based on the amount of focus correction from the sensitivity adjustment unit 113.

Thus, in response to a half-press of a release button 17 (ON of a switch SW1), the drive unit 114 moves the image capturing surface in a direction along the arrow 14b based on the signal of the focus state detection unit 115 to perform the focus control. Then, after an end of the focus control, the image capturing surface is driven in the direction along the arrow 14b based on the signal input from the sensitivity adjustment unit 113. As a result, the focus variation caused by the shake in the optical axis direction of the digital camera 100 is reduced.

Next, extraction frequencies of the band pass filters 19a and 19b will be described.

The focus state detection unit 115 obtains a change in focus state from an image signal obtained from the image-capturing element 14. A method of obtaining the change in focus state from the image signal is generally a method of detecting a phase difference of signals of the same subject (phase difference detection method) and a method of detecting a contrast change in an image (contrast detection method). These methods allow accurately detecting a change period of the focus state but have a problem of low detection accuracy of an amount of change.

Conversely, with the detection signal of the shake in the optical axis direction by the accelerometer, a shake amount can be stably obtained as long as an influence from noise can be eliminated. Therefore, in the present embodiment, the integrated signal of the accelerometer 16 is extracted using the change period of the focus state by the focus state detection unit 115 to reduce an influence of noise superimposed on the accelerometer 16.

In FIG. 1, a period output unit 116 obtains the change period of the output signal of the focus state detection unit 115 (period detection) and sets the period to the extraction frequencies of the band pass filters 19a and 19b. Here, FIG. 1 illustrates three graphs of waveforms 117, 118, and 119 together. The waveform 117 indicates a second order integral value of the accelerometer 16 output from the integrator 18b. The waveform 118 indicates a change period (period of focus variation) of the focus state output from the period output unit 116. The waveform 119 indicates a second order integral value of the accelerometer 16 that has been shaped with the band pass filter 19b.

In the waveform 117, although low frequency noise is superimposed on the displacement in the optical axis direction, extraction of a frequency range of the change period of the focus state of the waveform 118 from here obtains stable displacement in the optical axis direction as indicated by the waveform 119. The band pass filter 19a also shapes the waveform of the integrated result of the angular velocity meter 15a in the same frequency range. A comparison between the result and the waveform 119 by the comparative unit 110 allows obtaining the accurate rotation radius L0.

Since the rotation radius L0 is not a value changing frequently, once it is obtained, the shake amount in the optical axis direction can be obtained by multiplying the integral signal of the angular velocity meter 15a, which is the output from the integrator 18a, by the fixed rotation radius L0 after that. The multiplied integrated signal of the angular velocity meter 15a is not band-limited by the band pass filter 19a, and the angular velocity meter 15a is not affected by noise; therefore, the shake amount in the optical axis direction of the digital camera 100 can be stably obtained.

Figure 2:
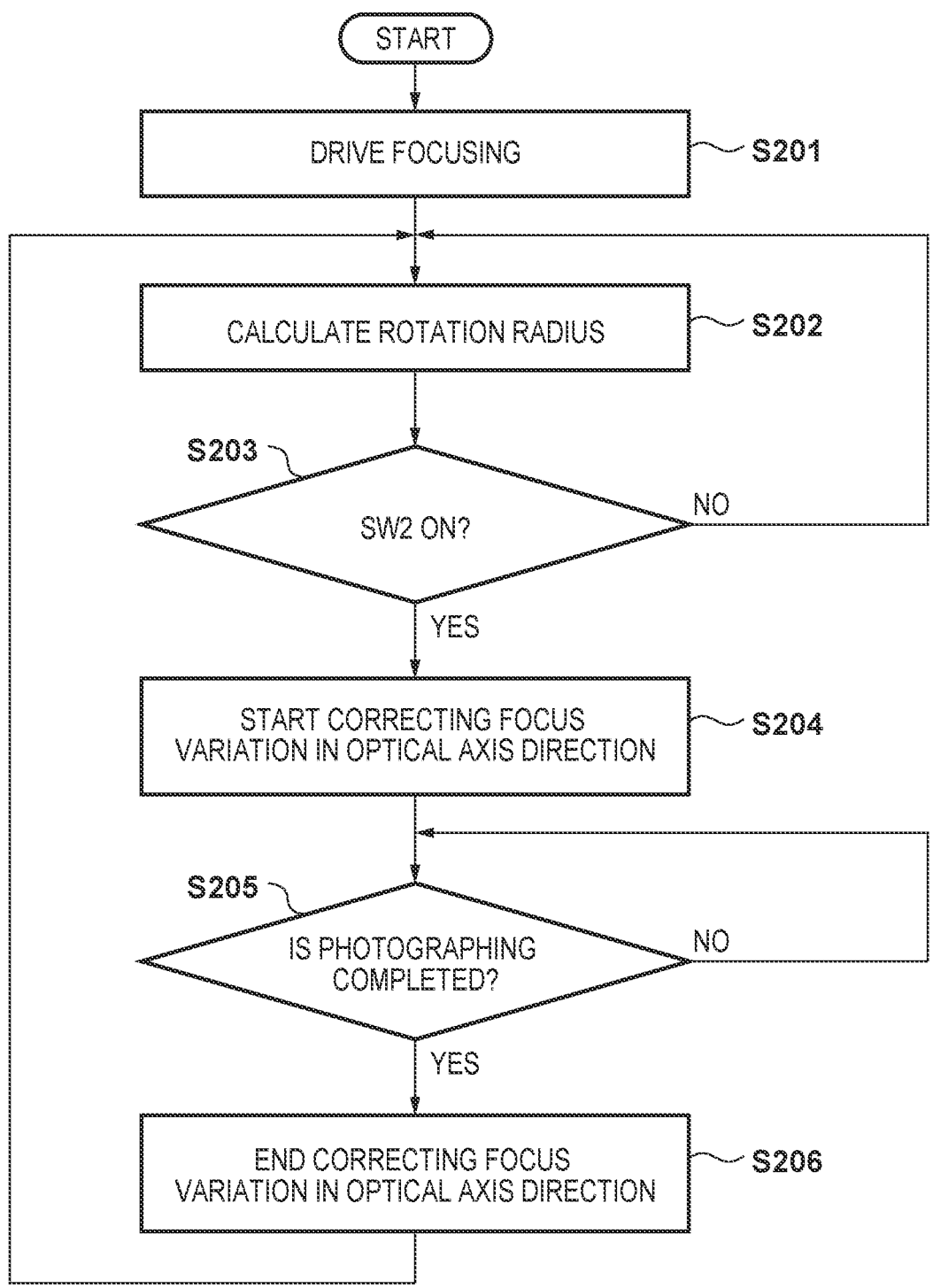
FIG. 2 is a flowchart depicting an operation for correcting a focus variation according to the first embodiment.

FIG. 2 is a flowchart depicting the operation for correcting the focus variation in the optical axis direction according to the present embodiment. The flowchart starts with the half-press of the release button 17 (ON of the switch SW1).

In Step S201, the focus control is performed on a primary subject by moving the image capturing surface of the image-capturing element 14 along the optical axis by the focus control mechanism 14a. At this point, the operation of correcting the focus variation caused by the shake in the optical axis direction is not performed.

In Step S202, the above-described rotation radius L0 is calculated.

In Step S203, while the rotation radius L0 is updated in Step S202, a standby state is maintained until the release button 17 is fully-pressed (ON of a switch SW2). When the release button 17 is fully-pressed, that is, a start of exposure is instructed, the process proceeds to Step S204.

In Step S204, using the rotation radius L0 obtained in Step S202 and the output signal of the angular velocity meter 15a, the amount of focus correction for correcting the focus variation in the optical axis direction is calculated. Then, the focus control mechanism 14a starts correcting the focus variation in the optical axis direction.

In Step S205, whether photographing is currently performed or not is determined. In the case where the photographing is currently performed, this step is repeated while being waited, and when the photographing is completed, the process proceeds to Step S206.

In Step S206, the correction of the focus variation in the optical axis direction is completed, and the process returns to Step S202.

Note that, although the description is omitted in this flowchart, in a case where the half-press of the release button 17 is released in the middle of the flow, the flow is exited.

Figure 3:
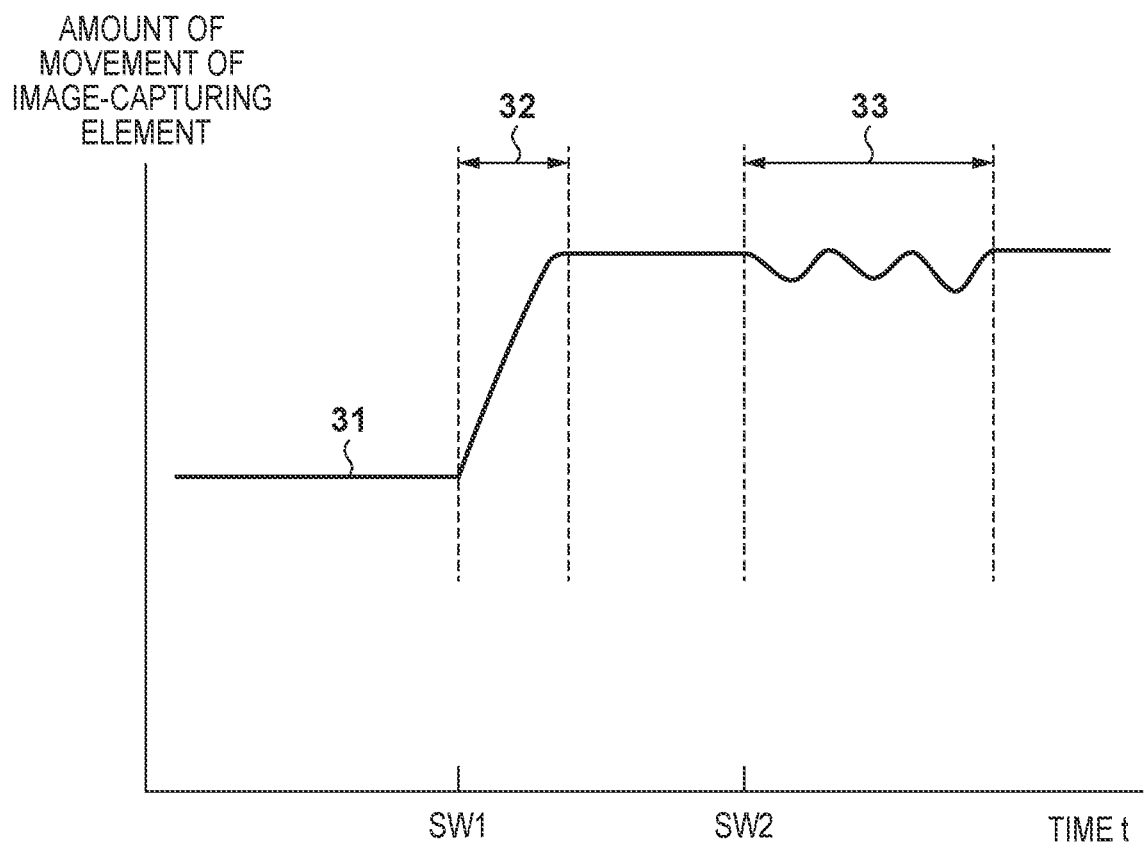
FIG. 3 is a diagram illustrating a correction waveform of the focus variation according to the first embodiment.

FIG. 3 is a diagram illustrating the movement of the image capturing surface by the focus control mechanism 14a. In FIG. 3, the horizontal axis indicates a time, and the vertical axis indicates an amount of movement of the image capturing surface of the image-capturing element 14 in the direction of the arrow 14b. A waveform 31 indicates the movement of the focus control mechanism 14a (movement of the image capturing surface). The focus control mechanism 14a performs focus control (range 32) on the primary subject with the half-press of the release button 17 (ON of the switch SW1) and corrects the focus variation in the optical axis direction in an exposure period (range 33) with the full press of the release button 17 (ON of the switch SW2).

Note that while the focus control mechanism 14a controls the focus of the primary subject and corrects the focus variation caused by the shake in the optical axis direction in the present embodiment, the focus of the primary subject may be controlled and the focus variation caused by the shake in the optical axis direction may be corrected using a focus lens disposed in the interchangeable lens 11b. Further, the focus control of the primary subject may be assigned to the interchangeable lens 11b side and the correction of the focus variation caused the by shake in the optical axis direction may be assigned to the camera body 11a side. Alternatively, the focus control of the primary subject may be assigned to the camera body 11a side and the correction of the focus variation caused by the shake in the optical axis direction may be assigned to the interchangeable lens 11b side.

Figure 4:
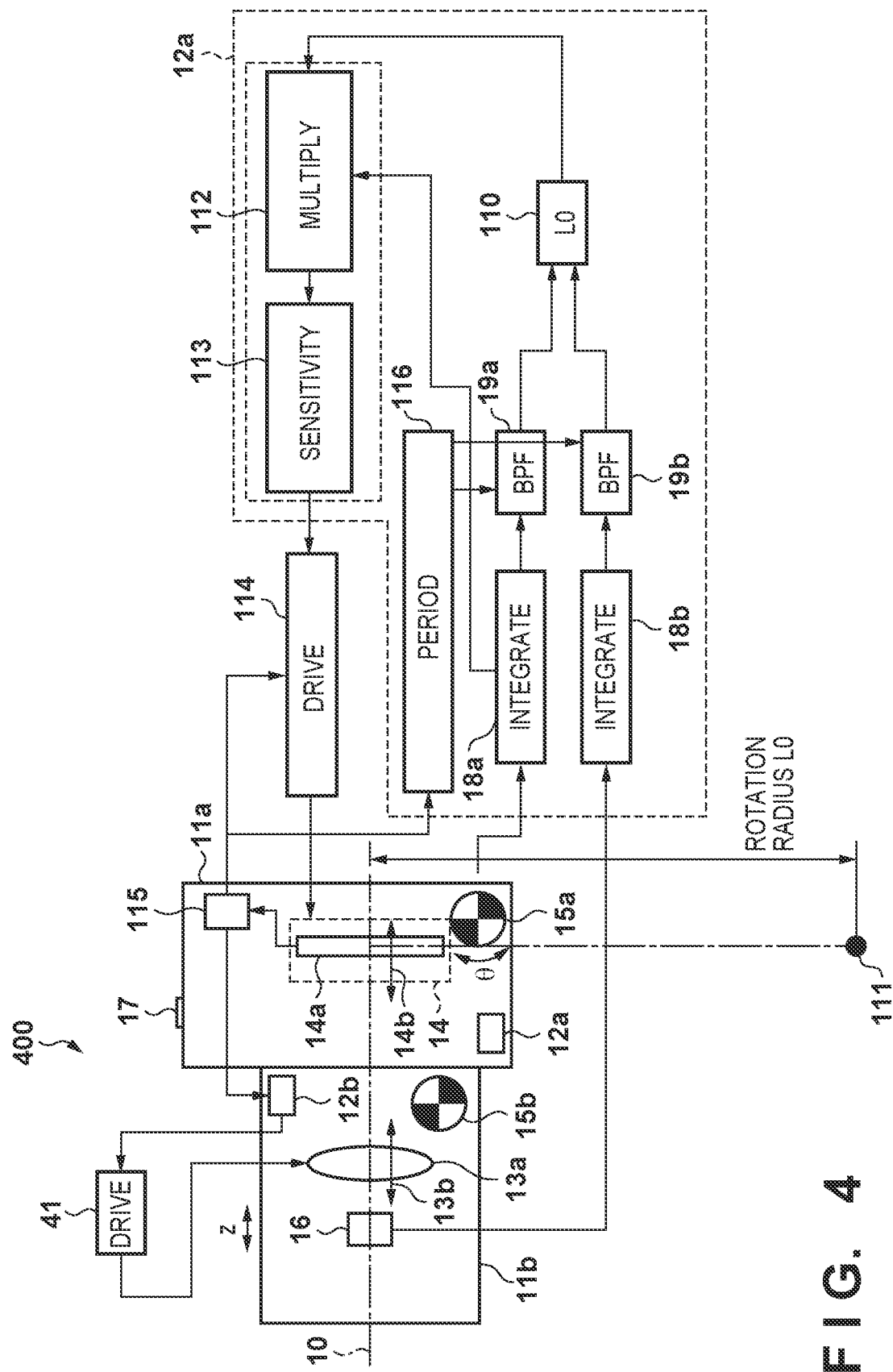
FIG. 4 is a block diagram of a digital camera according to a modification of the first embodiment.

FIG. 4 is a diagram illustrating a digital camera 400 in a configuration in which the interchangeable lens 11b side performs the focus control of the primary subject and the camera body 11a side corrects the focus variation in the optical axis direction. In FIG. 4, the signal of the focus state detection unit 115 is input to the lens CPU 12b disposed in the interchangeable lens 11b. Note that, actually, although the signal of the focus state detection unit 115 is input to the lens CPU 12b via the camera CPU 12a, for clarity of the drawing, FIG. 4 illustrates that the signal is input directly to the lens CPU 12b.

When the release button 17 is half-pressed (ON of the switch SW1), a drive unit 41 provided for the interchangeable lens 11b receives the signal of the lens CPU 12b and drives the focus lens 13a in the optical axis direction indicated by an arrow 13b to focus the primary subject.

Figure 5:
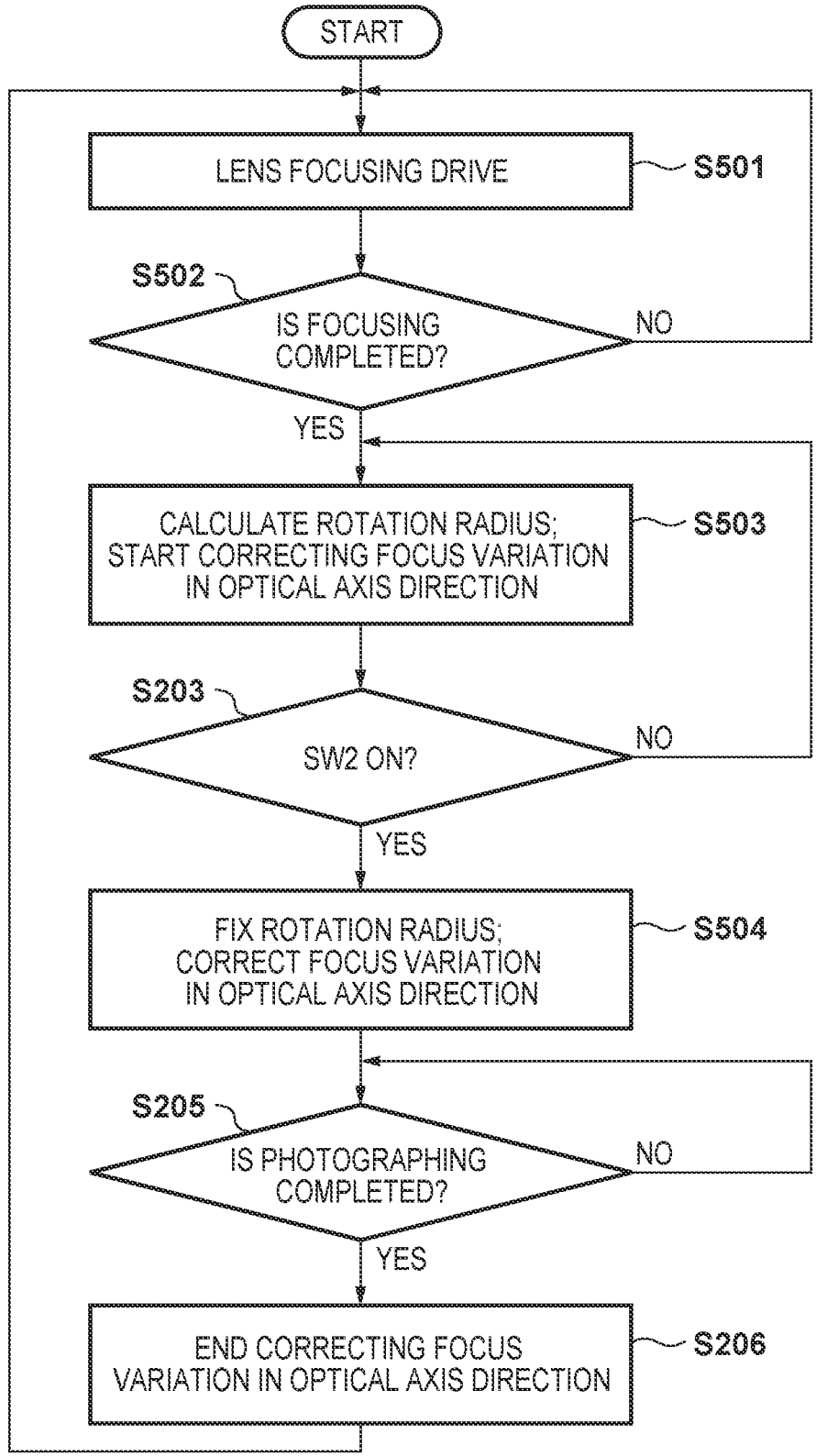
FIG. 5 is a flowchart depicting an operation for correcting the focus variation according to the modification of the first embodiment.

FIG. 5 is a flowchart of the operation for correcting the focus variation in the optical axis direction corresponding to FIG. 4. The flowchart starts with the half-press of the release button 17 (ON of the switch SW1). Note that steps of the same operations as those of the flowchart of FIG. 2 are denoted by the same step numbers.

In Step S501, the focus control is performed on the primary subject by moving the focus lens 13a along the optical axis. At this point, the focus control mechanism 14a does not correct the focus variation in the optical axis direction.

In Step S502, Steps S501 and S502 are repeated while a standby state is maintained until the focus control with the focus lens 13a is completed.

In Step S503, the rotation radius L0 is calculated and the focus control mechanism 14a starts correcting the focus variation in the optical axis direction based on the calculation result and the signal of the angular velocity meter 15a.

In Step S203, while the rotation radius L0 is updated in Step S202, the focus variation in the optical axis direction is corrected while a standby state is maintained until the release button 17 is fully-pressed (ON of the switch SW2). When the release button 17 is fully-pressed, that is, a start of exposure is instructed, the process proceeds to Step S504.

In Step S504, the update of the rotation radius L0 obtained in Step S202 is stopped, and using the fixed rotation radius L0 and the signal of the angular velocity meter 15a, the focus control mechanism 14a starts correcting the focus variation in the optical axis direction.

Here, a reason for stopping the update of the rotation radius L0 is to avoid the accelerometer 16 from outputting an error signal due to a vibration at shutter driving in association with the start of the exposure and to avoid the correction of the focus variation in the optical axis direction with the incorrect rotation radius.

In Step S205, whether photographing is currently performed or not is determined. In the case where the photographing is currently performed, this step is repeated while a standby state is maintained, and when the photographing is completed, the process proceeds to Step S206.

In Step S206, the correction of the focus variation in the optical axis direction is completed, and the process returns to Step S501.

Figure 6:
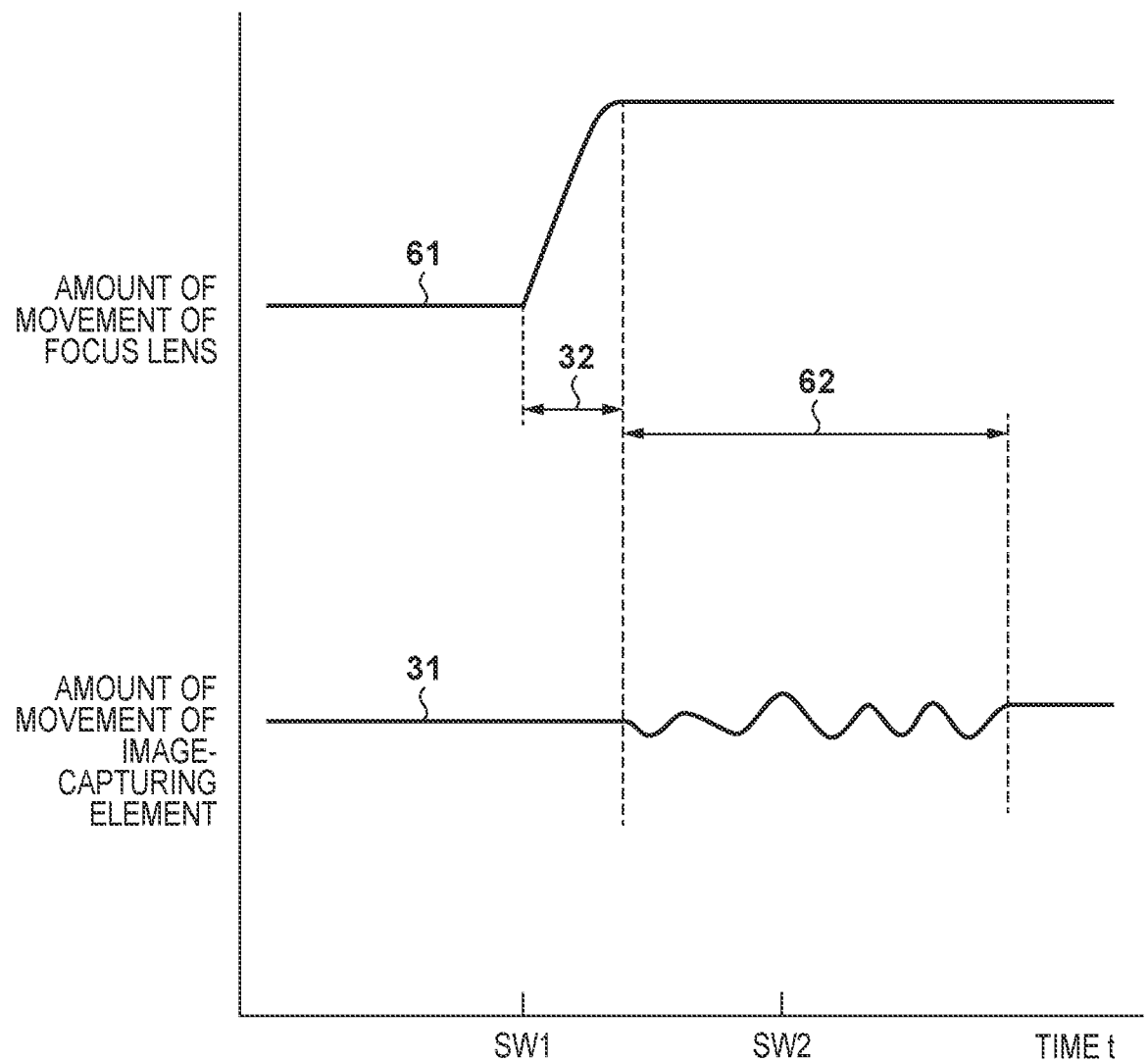
FIG. 6 is a diagram illustrating a correction waveform of the focus variation according to the modification of the first embodiment.

FIG. 6 is a diagram illustrating a movement of the focus lens 13a and a movement of the image capturing surface by the focus control mechanism 14a. In FIG. 6, the horizontal axis indicates a time, and the vertical axis indicates the amount of movement in the direction of the arrow 13b of the focus lens 13a and the amount of movement in the direction of the arrow 14b of the focus control mechanism 14a. A waveform 61 indicates the movement of the focus lens 13a. The focus control is performed on the primary subject with the half-press of the release button 17 (ON of the switch SW1) (range 32). The waveform 31 indicates the movement of the focus control mechanism 14a (movement of the image capturing surface). In an exposure period (range 62) after completion of the focus control by the focus lens 13a, the focus variation in the optical axis direction is corrected.

As can be seen from FIG. 3 and FIG. 6, assigning the focus control and the correction of focus variation in the optical axis direction to the focus lens 13a and the focus control mechanism 14a allows reducing a drive stroke by the focus control mechanism 14a.

Note that, in FIG. 1 and FIG. 4, a reason for using the accelerometer 16 on the interchangeable lens 11b side to detect the shake in the optical axis direction of the digital camera 100 is to keep a distance of the accelerometer 16 from the drive vibration of the focus control mechanism 14a for correcting the focus variation in the optical axis direction. However, when the drive vibration of the focus control mechanism 14a is small, an accelerometer may be disposed on the camera body 11a side and used for the detection of the rotation radius.

A reason for using the angular velocity meter 15a on the camera body 11a side for the detection of the rotation radius is that since characteristics of the angular velocity meter 15a are known more than those of various types of angular velocity meters mounted to the interchangeable lens 11b, signal processing is stable. However, in a case where characteristics of the angular velocity meter disposed on the interchangeable lens 11b side are known, the rotation radius may be detected and the shake in the optical axis direction may be detected using the angular velocity meter on the interchangeable lens 11b side.

In this way, extracting the signal of the accelerometer 16 based on the change period of the focus state from the focus state detection unit 115 allows stably detecting the shake in the optical axis direction.

Second Embodiment

In the first embodiment, the focus control has used one-shot AF. That is, once the focus control on the subject is completed, the focus control is not performed after that and the signal of the focus state detection unit 115 is used only for the correction of the focus variation in the optical axis direction.

In the second embodiment, the correction of the focus variation in the optical axis direction in a case of a servo AF that constantly continues the focus control after the half-press of the release button 17 (ON of the switch SW1) or before the half-press of the release button 17 will be described.

In the case of the servo AF, since the focus lens 13a is constantly driven, the focus state detection unit 115 outputs the focus control residual. The focus variation in the optical axis direction is corrected to some extent with the focus lens 13a.

From the characteristics of the servo AF, the following processes are performed in the second embodiment.

(1) The extraction frequency of the band pass filter is set based on a drive position of the focus lens 13a.

(2) The correction of the focus variation in the optical axis direction is set in association with a drive amount of the focus lens 13a.

Figure 7:
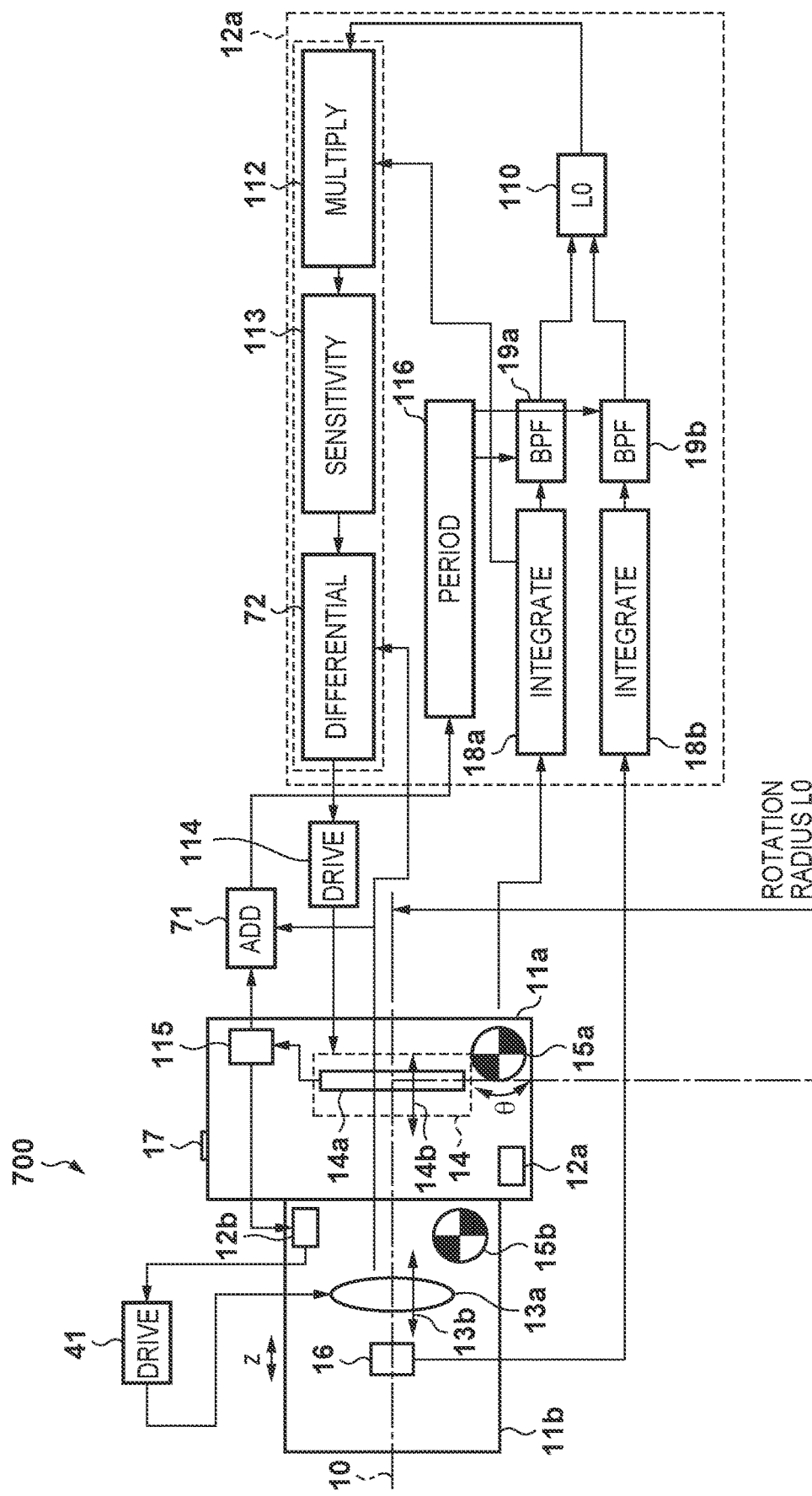
FIG. 7 is a diagram illustrating a configuration of a digital camera according to a second embodiment of the present invention.

FIG. 7 is a diagram illustrating a configuration of a digital camera 700 according to the second embodiment of the image capturing apparatus of the present invention. Different from FIG. 4, an adder 71 and a differential unit 72 are disposed in FIG. 7.

The adder 71 outputs an added signal found by adding a focus control residual signal output from the focus state detection unit 115 to a drive position signal of the focus lens 13a. As described above, in the servo AF, the focus lens 13a constantly performs the focus control based on the signal of the focus state detection unit 115. Therefore, the focus state detection unit 115 outputs the focus control residual signal. Thus, by adding the focus control residual signal and the drive position signal of the focus lens 13a, the focus state is accurately detected. The period output unit 116 identifies the change period of the focus state in this added signal to set it as the extraction frequencies of the band pass filters 19a and 19b.

The differential unit 72 obtains a difference between an amount of focus control drive of the focus lens 13a and the amount of correction of the focus variation in the optical axis direction from the sensitivity adjustment unit 113.

Figure 8:
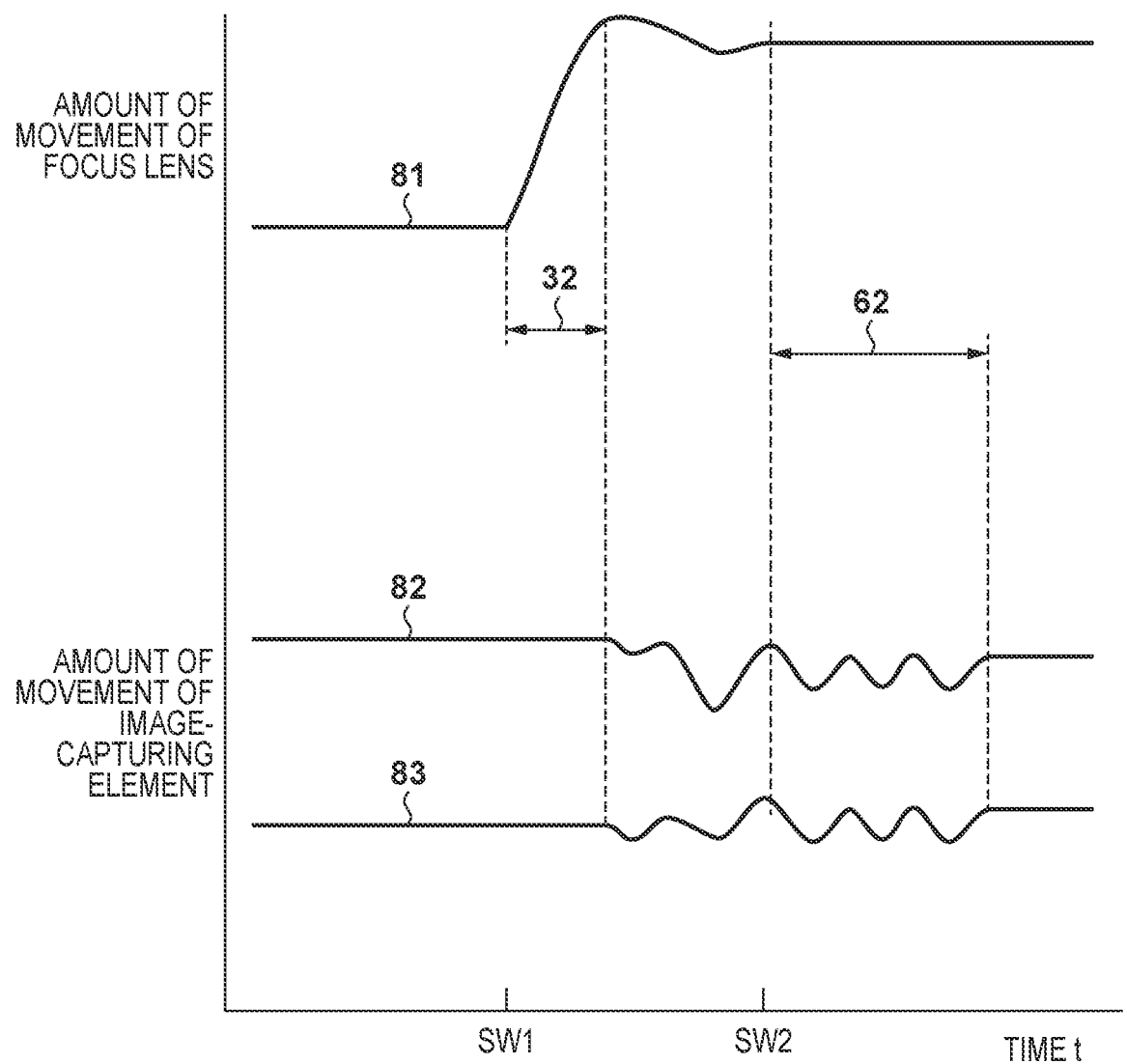
FIG. 8 is a diagram illustrating a correction waveform of a focus variation according to the second embodiment.

FIG. 8 is a diagram illustrating the movement of the focus lens 13a and the movement of the image capturing surface by the focus control mechanism 14a. In FIG. 8, the horizontal axis indicates a time, and the vertical axis indicates the amount of movement in the direction of the arrow 13b of the focus lens 13a and the amount of movement in the direction of the arrow 14b of the focus control mechanism 14a.

A waveform 81 indicates the amount of focus control drive of the focus lens 13a. After the focus control on the subject, as described above, the focus variation in the optical axis direction is corrected to some extent until before the start of photographing (ON of the switch SW2). Therefore, the use of a waveform 82 for the amount of correction of the focus variation in the optical axis direction as is to correct the focus variation in the optical axis direction results in excessive correction. Accordingly, the differential unit 72 obtains the difference between the waveforms 81 and 82 indicated by a waveform 83 and drives the focus control mechanism 14a using the signal so as to supplement the correction of the focus variation in the optical axis direction of the focus lens 13a.

As a result, the focus variation in the optical axis direction can be accurately corrected also in a state where the subject is aimed prior to the start of photographing. In this way, with the use of the servo AF as well, collaboration with the focus lens allows highly accurately correcting the focus variation in the optical axis direction.

Third Embodiment

Figure 9:
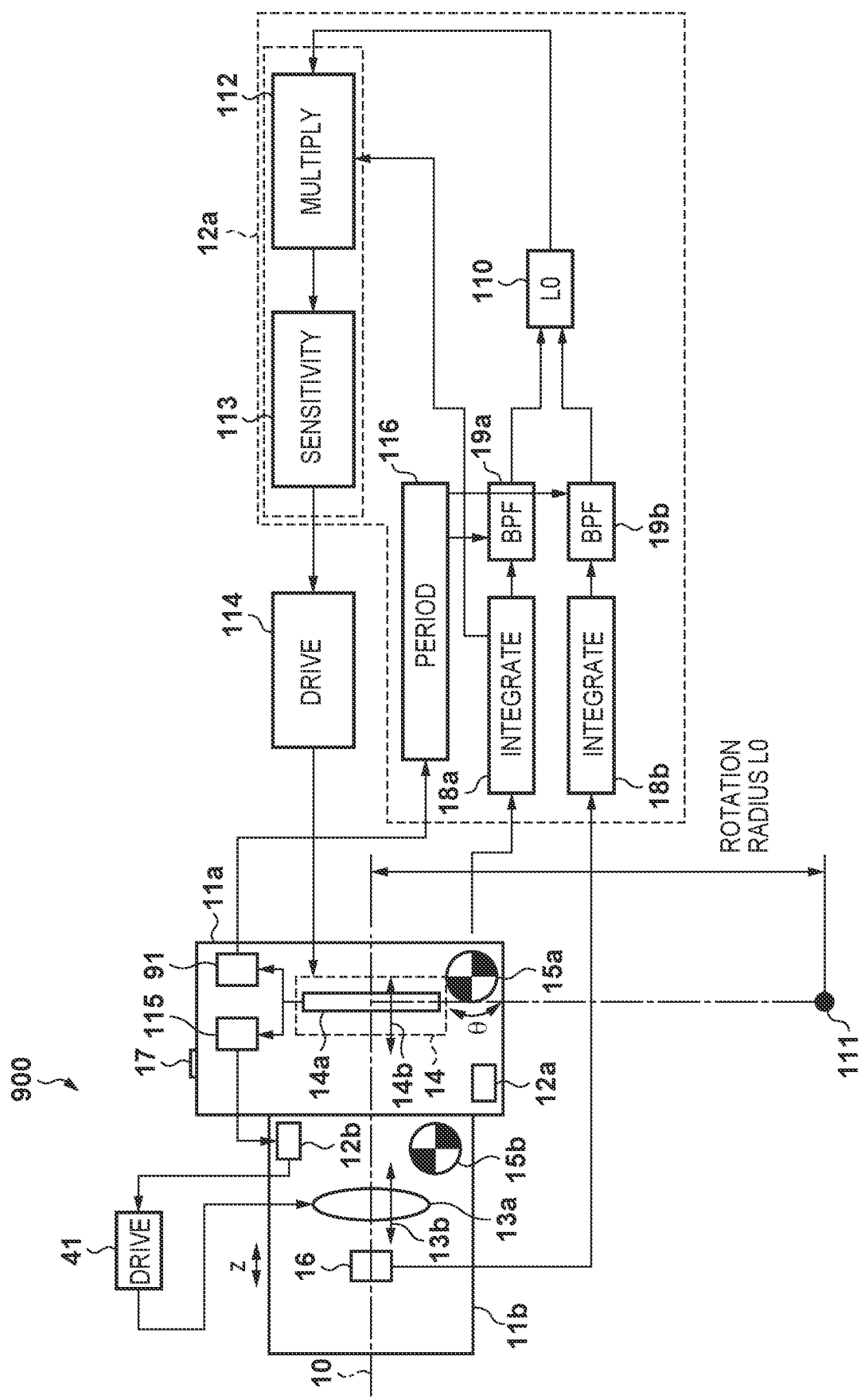
FIG. 9 is a diagram illustrating a configuration of a digital camera according to a third embodiment of the present invention.

FIG. 9 is a diagram illustrating a configuration of a digital camera 900 according to the third embodiment of the image capturing apparatus of the present invention. While the focus state detection unit 115 is used as means to detect the focus variation in the second embodiment, the third embodiment differs in use of an object recognition unit 91. The object recognition unit 91 uses a captured image signal of the image-capturing element 14 to capture a contour of the subject.

Figure 10:
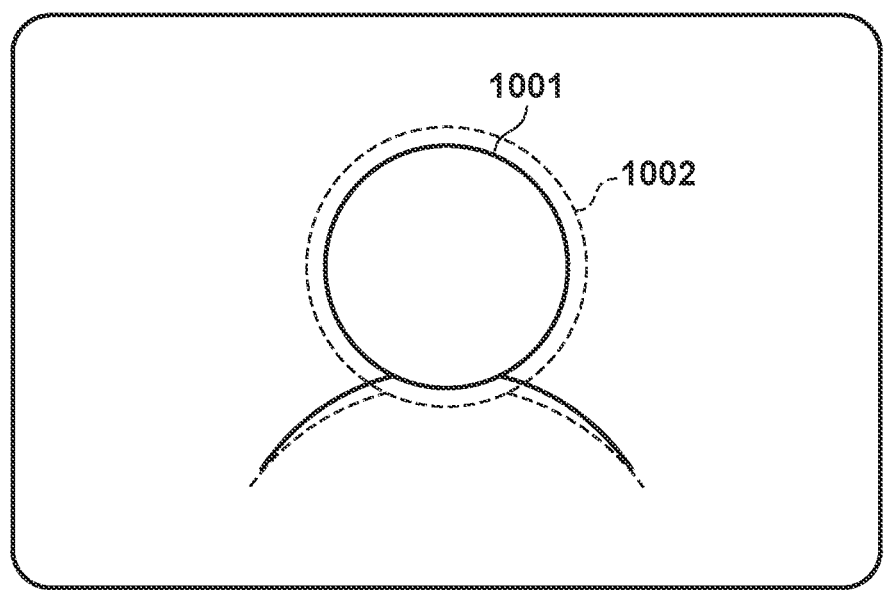
FIG. 10 is a diagram describing a change in image magnification.

FIG. 10 is a diagram illustrating the captured image signal capturing a contour 1001 of a subject. The contour 1001 changes as indicated by a dashed line 1002 in accordance with a change in image magnification due to the shake in the optical axis direction of the digital camera 900. The period output unit 116 detects a period of the change in image magnification from the object recognition unit 91 and sets the period to the band pass filters 19a and 19b.

A range of the frequency of the change in image magnification is extracted from the integrated signal of the accelerometer 16 by the integrator 18b with the band pass filter 19b, thus ensuring obtaining a stable displacement signal in the optical axis direction similarly to the waveform 119 of FIG. 1. In addition, the band pass filter 19a also shapes the waveform of the integrated result of the angular velocity meter 15a at the same period and the comparative unit 110 compares the result with the waveform 119, thus ensuring that an accurate rotation radius L0 is obtained.

Since the rotation radius L0 is not a value that changes frequently, once it is obtained, the shake amount in the optical axis direction can be obtained by multiplying the integral signal of the angular velocity meter 15a, which is the output from the integrator 18a, by the fixed rotation radius L0 after that. The multiplied integrated signal of the angular velocity meter 15a is not band-limited by the band pass filter 19a, and the angular velocity meter 15a is not affected by noise; therefore, the shake amount in the optical axis direction of the digital camera 100 can be stably obtained.

In this way, extracting the signal of the accelerometer 16 based on the change period of the image magnification from the object recognition unit 91 allows stable detection of the shake in the optical axis direction of the digital camera. Note that while the example in which the focus variation caused by the shake in the optical axis direction is corrected based on the detected shake in the optical axis direction has been described in the first to the third embodiments, the shake in the optical axis direction possibly results in a factor of variation in image magnification. Thus, instead of correcting the focus variation caused by the shake in the optical axis direction based on the detected shake in the optical axis direction, the variation in image magnification caused by the shake in the optical axis direction may be corrected. In this case, a zoom adjustment lens disposed in the interchangeable lens 11b mounted to the photographing optical system included in the image capturing apparatus or the image capturing apparatus is usable for correction of the shake in the optical axis direction. It is possible to correct the shake in the optical axis direction by obtaining a correction value for a zoom adjustment lens position so as not to vary the image magnification and driving the zoom adjustment lens based on the correction value obtained by image magnification adjustment means using the rotation radius L0 obtained in the above-described embodiment (for example, Step S202) and the output signal of the angular velocity meter 15a. In this case, the focus control mechanism 14a and the focus lens perform the focus control for focusing the primary subject, and the shake in the optical axis direction is assigned to the zoom adjustment lens side.

In addition, the focus variation caused by the shake in the optical axis direction may be corrected by control of the position of the focus lens and the variation in image magnification caused by the shake in the optical axis direction may be corrected by control of the position of the zoom adjustment lens to correct both the focus variation and the variation in image magnification caused by the shake in the optical axis direction. Further, depending on the configuration of the photographing optical system, simultaneously with moving the position of the focus lens and correcting the focus variation caused by the shake in the optical axis direction, the variation in image magnification can be corrected, or simultaneously with moving the position of the zoom adjustment lens and correcting the variation in image magnification caused by the shake in the optical axis direction, the focus variation can be corrected. The image capturing apparatus including such a photographing optical system or the image capturing apparatus to which a lens device including such a photographing optical system is mounted can correct the focus variation and the variation in image magnification by adjusting any one of the positions using the obtained rotation radius L0 and the output signal of the angular velocity meter 15a.

Additionally, a method of using image synthesis is available for the correction of the shake in the optical axis direction. Generally, for camera shake correction by image synthesis, there has been known a method that photographs multiple images in a short exposure period where blur is small and synthesizes the images while matching positions between the images to eliminate a blur between the images. While correction of blur in the optical axis direction photographs and synthesizes multiple images as well, in the synthesis, the images are scaled to correct the blur in the optical axis direction generated between the images. The image synthesis may be used in combination with the correction by focus control with the zoom adjusting lens and the focus lens on the interchangeable lens 11b side and by the camera body 11a side.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-030793, filed Feb. 22, 2019 which is hereby incorporated by reference herein in its entirety.

What is claimed is:
1. An image capturing apparatus, comprising:
an image capturing device configured to capture a subject image;
a period detection circuit configured to detect a period of a focus variation of the subject image formed on an image capturing surface of the image capturing device with a lens;
a first detection device configured to detect a first translation component, the first translation component being a component in a direction along an optical axis of shake of the image capturing apparatus;

a second detection device configured to detect a rotation component of the shake of the image capturing apparatus; and at least one processor or circuit configured to function as:

a first extraction unit configured to extract a component of a predetermined frequency band from the first translation component based on the period of the focus variation;

a second extraction unit configured to extract the component of the predetermined frequency band from the rotation component based on the period of the focus variation;

a obtaining unit configured to compare a signal extracted by the first extraction unit with a signal extracted by the second extraction unit to obtain a rotation radius of the shake of the image capturing apparatus; and a translation obtaining unit configured to obtain a second translation component using the signal from the second detection device and the rotation radius, the second translation component being a component in the direction along the optical axis of the shake of the image capturing apparatus.

2. The image capturing apparatus according to claim 1, wherein
the first detection device includes an accelerometer and a first integration circuit, the accelerometer being configured to detect an acceleration in the direction along the optical axis, the first integration circuit being configured to integrate an output signal of the accelerometer.

3. The image capturing apparatus according to claim 2, wherein
the first integration circuit is configured to perform a second order integral on the output signal of the accelerometer to obtain an amount of movement in the direction along the optical axis of the image capturing apparatus as the first translation component.

4. The image capturing apparatus according to claim 2, wherein
the accelerometer is disposed in the lens, the lens being detachable from a main body of the image capturing apparatus.

5. The image capturing apparatus according to claim 1, wherein
the second detection device includes an angular velocity meter and a second integration circuit, the angular velocity meter being configured to detect an angular velocity of a rotation of the image capturing apparatus, the second integration circuit being configured to integrate an output signal of the angular velocity meter.

6. The image capturing apparatus according to claim 5, wherein
the second integration circuit is configured to perform a first order integral on the output of the angular velocity meter to obtain a rotation angle of the image capturing apparatus as the rotation component.

7. The image capturing apparatus according to claim 5, wherein
the angular velocity meter is disposed in a main body of the image capturing apparatus.

8. The image capturing apparatus according to claim 1, wherein
the period detection circuit is configured to detect the period of the focus variation based on a signal of a focus detection device, the focus detection device being configured to detect a focus state of the subject image.

9. The image capturing apparatus according to claim 8, wherein
the period detection circuit is configured to output an added signal of a focus control residual signal output from the focus detection device and a drive position signal of a focus lens.

10. The image capturing apparatus according to claim 8, wherein
the focus detection device is configured to detect the focus state of the subject image by a phase difference detection method.

11. The image capturing apparatus according to claim 8, wherein
the focus detection device is configured to detect the focus state of the subject image by a contrast detection method.

12. The image capturing apparatus according to claim 1, wherein
the period detection circuit is configured to detect a period of a change in image magnification of the subject image obtained by the image capturing device to detect the period of the focus variation.

13. The image capturing apparatus according to claim 1, comprising
a focus control device configured to control a focus based on the second translation component.

14. The image capturing apparatus according to claim 1, further comprising
a focus control device configured to control a focus based on a signal produced by subtracting a drive position of a focus lens from an amount of correction of the focus variation based on the second translation component.

15. The image capturing apparatus according claim 1, wherein
the at least one processor or circuit is configured to further function as an image magnification adjustment unit configured to adjust image magnification based on the second translation component.

16. The image capturing apparatus according to claim 1, wherein
the at least one processor or circuit is configured to further function as an image process unit configured to perform an image process based on the second translation component.

17. A method of controlling an image capturing apparatus including an image capturing device, the image capturing device capturing a subject image, the method comprising:

detecting a period of a focus variation of the subject image formed on an image capturing surface of the image capturing device with a lens;

detecting a first translation component, the first translation component being a component in a direction along an optical axis of shake of the image capturing apparatus;

detecting a rotation component of the shake of the image capturing apparatus;

performing a first extraction that extracts a component of a predetermined frequency band from the first translation component based on the period of the focus variation;

performing a second extraction that extracts the component of the predetermined frequency band from the rotation component based on the period of the focus variation;

comparing a signal extracted in the first extraction with a signal extracted in the second extraction to obtain a rotation radius of the shake of the image capturing apparatus; and calculating a second translation component using the signal from the second detection and the rotation radius, the second translation component being a component in the direction along the optical axis of the shake of the image capturing apparatus.

18. A non-transitory computer-readable storage medium storing a program to cause a computer to execute each step for a control method of an image capturing apparatus including an image capturing device, the image capturing device capturing a subject image, the method comprising:

detecting a period of a focus variation of the subject image formed on an image capturing surface of the image capturing device with a lens;

detecting a first translation component, the first translation component being a component in a direction along an optical axis of shake of the image capturing apparatus;

detecting a rotation component of the shake of the image capturing apparatus;

performing a first extraction that extracts a component of a predetermined frequency band from the first translation component based on the period of the focus variation;

performing a second extraction that extracts the component of the predetermined frequency band from the rotation component based on the period of the focus variation;

comparing a signal extracted in the first extraction with a signal extracted in the second extraction to obtain a rotation radius of the shake of the image capturing apparatus; and calculating a second translation component using the signal from the second detection and the rotation radius, the second translation component being a component in the direction along the optical axis of the shake of the image capturing apparatus.

* * * * *